Patented Dec. 4, 1934

1,982,778

UNITED STATES PATENT OFFICE 1,982,778

CELLULOSE DERIVATIVE ARTICLES AND METHOD OF PREPARING THE SAME

Bjorn Andersen, Maplewood, N. J., assignor to Celluloid Corporation, a corporation of New Jersey No Drawing. Application May 12, 1932, Serial No. 610,972

25 Claims. (Cl. 18—57)

This invention relates to the preparation of foils, films and like articles made of cellulose derivatives and relates more particularly to rendering the same less tacky and therefore more easily handled.

An object of my invention is to render articles, and more particularly sheet-like articles made of derivative of cellulose material less tacky by incorporating in at least the surface thereof a relatively transparent filler. Other objects of this invention will appear from the following detailed description.

Thin foils made of a plastic composition containing cellulose acetate and the usual proportion of plasticizers are relatively tacky, so that when such foils are unrolled, or are run through wrapping machines, the friction between the surfaces of the foil and adjacent surfaces is so great that there is generated a large amount of static electricity which causes great difficulty in handling the material. Moreover, when this foil is cut in the form of sheets in a stack, because of this tackiness, it is extremely difficult to separate the individual sheets.

If attempts are made to overcome this tackiness by reducing the content of the plasticizer in the derivative of cellulose composition of the foil, it is found that the resulting product is too brittle and lacking in toughness to be commercially useful when the plasticizer content is reduced sufficiently to avoid this tackiness.

I have found that if a relatively transparent solid or filling material is incorporated in at least the surface of the foils, films and like material made of plastic compositions containing derivatives of cellulose and plasticizers, tackiness of the foils may be substantially entirely overcome, so that foils having sufficient plasticizer to impart toughness thereto may be made, which foils are not tacky, so that they can be unrolled, run through wrapping machinery and otherwise manipulated without any difficulty due to static electricity.

In accordance with my invention, I render foils, films or other articles made of plastic compositions containing derivatives of cellulose and plasticizer less tacky by incorporating in at least the surfaces thereof a filler that is relatively transparent.

Articles to be treated in accordance with this invention may be of any suitable form. This invention is particularly applicable to the treatment of foils or transparent paper having a thickness of the order of 0.0005" to 0.003" to be used for wrapping articles or for any other suitable purpose. The articles to be treated by this invention on the other hand may be in the form of films to be used for photographic, cinematographic or other purposes, or other sheet-like materials, which may be made by casting, or flowing a solution of the cellulose derivative and plasticizer onto smooth metallic or glass surfaces, such as film wheels, drums, bands, tables, etc., as is well known in the art. The articles to be treated by this invention may be made of or contain on at least the surface thereof any suitable cellulose derivative. The derivatives of cellulose include besides nitrocellulose, organic derivatives of cellulose such as organic esters of cellulose and cellulose ethers. Examples of organic esters of cellulose are cellulose acetate, cellulose formate, cellulose butyrate and cellulose propionate, while examples of cellulose ethers are ethyl cellulose, methyl cellulose and benzyl cellulose.

Generally the articles will contain a cellulose derivative and a substantial amount of plasticizers, such as dimethyl phthalate, diethyl phthalate, triphenyl phosphate, tricresyl phosphate, dimethoxyethyl phthalate, dibutyl phthalate, diethyl tartrate, dibutyl tartrate, para ethyltoluene sulfonamid, mono methyl xylene sulfonamid or mixtures of two or more of these. The specific plasticizers chosen and the proportions thereof employed will vary with the derivative of cellulose present, and the desired characteristics, such as strength, toughness, hardness, flexibility, etc., desired in the foil. In case of cellulose acetate the amount of plasticizer employed will generally be from 25 to 75% of the weight of the cellulose acetate present. Any other desired materials such as pigments and effect materials may be incorporated, as is well known in the cellulose derivative plastic art.

In order to render the foils or other articles less tacky, I incorporate in at least the surface thereof an insoluble transparent or translucent solid material; i. e. a material which does not form a solution with the derivative of cellulose and/or plasticizer present in the foils or with the solvent employed for dissolving the derivative of cellulose to form the dope from which the foils are made. Examples of such transparent or translucent materials are aluminum hydrate (aluminum hydroxide) amorphous diatomaceous silica, glass powder, mercerized cellulose fibers and the like. Generally the use of aluminum hydroxide is preferable, especially in the case of foils or films made of cellulose acetate, since it does not detract to any appreciable extent from the transparency or clarity of the foil, while at the same time reducing the tackiness and friction created by rubbing the sheets of foil over various surfaces.

In one form of my invention, the aluminum hydroxide or other transparent filling material may be incorporated in the dope or solution of the derivative of cellulose and plasticizer from which the foils, films or other articles are made, so that the filling material is dispersed throughout the finished foils or films. The amount of filler employed, especially in the case of aluminum hydroxide is preferably from 0.5 to 10% or more of the derivative of cellulose present. This filler may be incorporated in the dope either before or after filtration of the same, and generally will be of very fine particle size, say on the order of 0.5 to 10 microns in diameter. The dope or solution may be made by dissolving the derivative of cellulose in any suitable volatile solvents, examples of such solvents, in the case of acetone-soluble cellulose acetate, being acetone, a mixture of acetone and alcohol, mixtures of ethyl acetate, acetone and ethyl alcohol and the like.

The filler can be incorporated in the dope or solution of the derivative of cellulose in any suitable manner. The filler may be soaked with a small amount of the derivative of cellulose, plasticizer and solvent in a kneading machine and then worked between heated malaxating rolls thoroughly to incorporate the same, and the plastic material so formed may then be incorporated in the main body of the dope for final dispersion. Alternatively, and for some purposes preferably, the filler such as aluminum hydroxide may be mixed in high concentration with the solvent used in making the dope, to which a small amount of derivative of cellulose and plasticizer may or may not be added, and then passed through a colloid mill after which it is added to and dispersed in the main body of the dope.

As an alternative method of carrying out my invention, instead of incorporating the filler in the dope and thus throughout the whole of the resulting film or foil, the filler may be incorporated in only one or both surfaces of the foil or film. This may be done by spraying a fine dust of the finely divided filler on to the surface of the foil or film while it is soft. This may be conveniently done by applying the filler to the unhardened foil sheet surface shortly after the dope has been cast upon the casting surface and before a substantial amount of volatile solvent has evaporated. Alternatively, the filler can be suspended in a solvent for the derivative of cellulose or in a dilute solution of the derivative of cellulose and this liquid sprayed or otherwise applied to one or both surfaces of the foil or film.

Foils or films made in accordance with this invention have many desirable properties. While possessing the strength and toughness due to the presence of plasticizers therein, they are not tacky, with the result that they can be subjected to friction without generating an undue amount of static electricity when rolls of the same are unwound or when they are passed in contact with surfaces in wrapping or other manipulative processes. This lack of tackiness is further indicated by the fact that when two sheets of foil made in accordance with this invention are pressed together and the pressure then released, the adjacent surfaces do not make optical contact with each other, while similar foils not containing the filler make complete optical contact with each other. Moreover, the presence of the filler reduces the tendency of the plasticizer to exude.

In order further to illustrate this invention, but without being limited thereto, the following specific examples are given.

Example I

A dope is made up having the following composition:

| | Parts by weight |
|---|---|
| Acetone-soluble cellulose acetate | 100 |
| Dimethyl phthalate | 10 |
| Dimethoxyethyl phthalate | 25 |
| Triphenyl phosphate | 10 |
| Aluminum hydroxide | 1 to 5 |
| Acetone | 300 |

One type of aluminum hydroxide that may be used contains from 0 to 10% of moisture as determined by baking the same at 95 to 100° C. for one hour. If the aluminum hydroxide is freshly precipitated and thoroughly washed free of alkali and then dehydrated with alcohol, a superior transparency is obtained.

The aluminum hydroxide is dispersed in an equal weight of the solvent by means of a colloid mill and then mixed into the solution of the cellulose acetate in the plasticizers and remaining solvent. The solution is filtered to remove foreign material and then cast on to a smooth surface, preferably the periphery of a rotating wheel or drum, which is of polished nickel or other metal. The volatile solvents are caused to evaporate until a film of substantial strength is formed. The film or foil is then stripped from the casting surface and then passed through festoon driers at elevated temperatures for complete drying or seasoning and finally wound up on a roll or spool.

Example II

The following is another example of a composition that may be employed for making foils.

| | Parts by weight |
|---|---|
| Acetone-soluble cellulose acetate | 100 |
| Dimethyl phthalate | 12.5 |
| Paraethyltoluene sulfonamid | 20 |
| Triphenyl phosphate | 12.5 |
| Amorphous diatomaceous silica | 5 |
| Acetone | 300 |
| Ethyl alcohol | 50 |

The diatomaceous silica is incorporated in the dope in a manner similar to that described in Example I and the foils are also made in a similar manner.

It is to be understood that the foregoing detailed description is given merely by way of illustration and that many variations may be made therein without departing from the spirit of my invention.

Having described my invention, what I desire to secure by Letters Patent is:

1. The method of rendering surfaces containing a derivative of cellulose less tacky comprising incorporating in surfaces of plastic compositions containing a derivative of cellulose a solid, insoluble relatively transparent material.

2. The method of rendering surfaces containing cellulose acetate less tacky comprising incorporating in surfaces of plastic compositions containing cellulose acetate a solid, insoluble relatively transparent material.

3. The method of rendering surfaces containing a derivative of cellulose less tacky, which comprises incorporating in surfaces of plastic material containing a derivative of cellulose a substance selected from the group consisting of colloidal aluminum hydroxide and amorphous diatomaceous silica.

4. The method of rendering surfaces containing cellulose acetate less tacky, which comprises incorporating in surfaces of plastic material containing cellulose acetate a substance selected from the group consisting of colloidal aluminum hydroxide and amorphous diatomaceous silica.

5. The method of rendering surfaces containing a derivative of cellulose less tacky comprising incorporating colloidal aluminum hydroxide in surfaces of plastic compositions containing a derivative of cellulose.

6. The method of rendering surfaces containing cellulose acetate less tacky comprising incorporating colloidal aluminum hydroxide in surfaces of plastic compositions containing cellulose acetate.

7. The method of rendering surfaces containing a derivative of cellulose less tacky comprising incorporating amorphous diatomaceous silica in surfaces of plastic compositions containing a derivative of cellulose.

8. Method of rendering foils or films less tacky comprising incorporating in at least the surfaces of foils or films made of a plastic composition containing a derivative of cellulose and plasticizer, a solid, insoluble relatively transparent material.

9. Method of rendering foils or films less tacky comprising incorporating in at least the surfaces of foils or films made of a plastic composition containing cellulose acetate and plasticizer, a solid, insoluble relatively transparent material.

10. Method of rendering foils or films less tacky comprising incorporating colloidal aluminum hydroxide in at least the surfaces of foils or films made of a plastic composition containing a derivative of cellulose and plasticizer.

11. Method of rendering foils or films less tacky comprising incorporating colloidal aluminum hydroxide in at least the surfaces of foils or films made of a plastic composition containing cellulose acetate and plasticizer.

12. Method of rendering foils or films less tacky comprising incorporating amorphous diatomaceous silica in at least the surfaces of foils or films made of a plastic composition containing cellulose acetate and plasticizer.

13. Method of preparing foils or films of low degree of tackiness comprising forming a solution of a derivative of cellulose and plasticizer in a volatile solvent, which solution contains a solid, relatively transparent insoluble material in amounts of 5 to 10% of the weight of the derivative of cellulose, into sheets and causing the volatile solvent to evaporate.

14. Method of preparing foils or films of low degree of tackiness comprising forming a solution of cellulose acetate and plasticizer in a volatile solvent, which solution contains a solid, relatively transparent insoluble material in amounts of 5 to 10% of the weight of the cellulose acetate, into sheets and causing the volatile solvent to evaporate.

15. Method of preparing foils or films of low degree of tackiness comprising forming a solution of cellulose acetate and plasticizer in a volatile solvent, which solution contains colloidal aluminum hydroxide in amounts of 5 to 10% of the weight of the cellulose acetate, into sheets and causing the volatile solvent to evaporate.

16. Articles having a surface of a plastic composition comprising a derivative of cellulose and plasticizer, which surface contains a solid, relatively transparent insoluble material.

17. Articles having a surface of a plastic composition comprising a derivative of cellulose and a plasticizer, which surface contains a substance selected from the group consisting of colloidal aluminum hydroxide and amorphous diatomaceous silica.

18. Foils or films of a plastic composition comprising a derivative of cellulose and plasticizer and containing a solid, insoluble relatively transparent material in at least the surface thereof.

19. Foils or films of a plastic composition comprising cellulose acetate and plasticizer and containing a solid, insoluble relatively transparent material in at least the surface thereof.

20. Foils or films of a plastic composition comprising cellulose acetate and plasticizer and containing colloidal aluminum hydroxide in at least the surface thereof.

21. Foils or films of a plastic composition comprising cellulose acetate and plasticizer and containing amorphous diatomaceous silica in at least the surface thereof.

22. Foils or films of reduced thickness, said foils or films being composed of a plastic composition containing a derivative of cellulose and plasticizer having a solid, relatively transparent insoluble material dispersed therein.

23. Foils or films of reduced thickness, said foils or films being composed of a plastic composition containing cellulose acetate and plasticizer having a solid, relatively transparent insoluble material dispersed therein.

24. Foils or films of reduced thickness, said foils or films being composed of a plastic composition containing cellulose acetate and plasticizer having colloidal aluminum hydroxide dispersed therein.

25. Foils or films of reduced thickness, said foils or films being composed of a plastic composition containing cellulose acetate and plasticizer having amorphous diatomaceous silica dispersed therein.

BJORN ANDERSEN.